United States Patent
Gokaraju et al.

(10) Patent No.: US 7,859,705 B2
(45) Date of Patent: Dec. 28, 2010

(54) SYSTEMS AND METHODS FOR CREATING AND USING OVERLAY FILES THAT ARE APPLICATION INDEPENDENT AND DEVICE INDEPENDENT

(75) Inventors: Radha Madhavi Gokaraju, Banaglore (IN); James E. Owen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1141 days.

(21) Appl. No.: 11/255,172

(22) Filed: Oct. 20, 2005

(65) Prior Publication Data

US 2007/0091368 A1    Apr. 26, 2007

(51) Int. Cl.
*G06K 15/00* (2006.01)

(52) U.S. Cl. .................. 358/1.18; 358/1.9; 358/540

(58) Field of Classification Search ............... 358/1.18, 358/537, 538, 540, 1.13, 1.14, 1.15, 1.16, 358/1.17, 1.9; 400/76; 101/483; 399/81; 341/82; 382/298; 345/636
See application file for complete search history.

(56) References Cited

U.S. PATENT DOCUMENTS

| | | | | |
|---|---|---|---|---|
| 5,822,503 | A * | 10/1998 | Gass et al. | 358/1.9 |
| 6,268,927 | B1 * | 7/2001 | Lo et al. | 358/1.15 |
| 6,471,423 | B1 * | 10/2002 | Yamada | 400/76 |
| 6,501,561 | B2 | 12/2002 | Hayashi | |
| 6,590,675 | B1 | 7/2003 | Tomiyasu | |
| 6,765,688 | B1 * | 7/2004 | Claiborne | 358/1.18 |
| 7,057,747 | B1 * | 6/2006 | Minagawa | 358/1.13 |
| 7,319,533 | B2 * | 1/2008 | Ferlitsch | 358/1.15 |
| 2002/0089689 | A1 * | 7/2002 | Ferlitsch et al. | 358/1.15 |
| 2003/0202213 | A1 | 10/2003 | Saito | |
| 2003/0226114 | A1 * | 12/2003 | Feldman et al. | 715/523 |
| 2004/0054652 | A1 * | 3/2004 | Teh et al. | 707/1 |
| 2004/0134369 | A1 * | 7/2004 | East | 101/483 |
| 2005/0078974 | A1 * | 4/2005 | Uchida et al. | 399/81 |
| 2005/0134878 | A1 * | 6/2005 | Ebuchi | 358/1.18 |
| 2006/0238807 | A1 * | 10/2006 | Natori | 358/1.15 |
| 2006/0290544 | A1 * | 12/2006 | Scheidhauer et al. | 341/82 |
| 2006/0291749 | A1 * | 12/2006 | Scheidhauer et al. | 382/298 |
| 2007/0008343 | A1 * | 1/2007 | Scheidhauer et al. | 345/636 |

FOREIGN PATENT DOCUMENTS

| | | |
|---|---|---|
| JP | 03-121526 | 5/1991 |
| JP | 05-119937 | 5/1993 |
| JP | 11-316668 | 11/1999 |
| JP | 2000-099299 | 4/2000 |

\* cited by examiner

*Primary Examiner*—Twyler L Haskins
*Assistant Examiner*—Nicholas C Pachol
(74) *Attorney, Agent, or Firm*—Austin Rapp & Hardman

(57) ABSTRACT

In an exemplary method, a request is received to save an overlay document that comprises content for an overlay. Graphics commands for the overlay document are also received. The graphics commands are stored in an overlay file. The format of the overlay file is both application independent and device independent. A request is received to print a base document. In response to the request, the graphics commands in the overlay file are rendered, thereby creating printing commands for the overlay document. The printing commands for the overlay document are merged with the base document's printing commands, thereby creating a printing command stream. The printing command stream is sent to a printing device.

19 Claims, 10 Drawing Sheets

SYSTEMS AND METHODS FOR CREATING AND USING OVERLAY FILES THAT ARE APPLICATION INDEPENDENT AND DEVICE INDEPENDENT

TECHNICAL FIELD

The present invention relates generally to computers and computer-related technology. More specifically, the present invention relates to systems and methods for creating and using overlay files that are application independent and device independent.

BACKGROUND

There are many different kinds of computers in use today. The term "computer system" will be used herein to refer generally to any device or combination of devices that is capable of processing information to produce a desired result. Some examples of computer systems include personal computers, hand-held computers, personal digital assistants (PDAs), servers, mainframes, supercomputers, minicomputers, workstations, microcomputers, microcontrollers, and the like.

The term "printing device," as used herein, refers to any device that produces human-readable text and/or graphics on an output medium, such as paper. Some examples of printing devices include computer printers, fax machines, scanners, multi-function peripherals, copiers, and so forth.

To facilitate communication between a computer system and a printing device, the computer system may include a driver for the printing device. The driver for a particular printing device allows applications on the computer system to be able to communicate with the printing device without knowing specific details about the printing device's hardware and internal language.

Overlays are sometimes used in connection with printing documents. An "overlay" refers to text and/or graphics that may be superimposed on a document during printing. The text and/or graphics that comprise an overlay may be included in an overlay file.

An overlay file may include content that is likely to be used in connection with multiple documents. For example, it may be desirable for an organization's logo to be positioned at the top of all of the organization's documents. To achieve this, an overlay file may be created that includes the organization's logo as a header. Whenever an employee prints a document, the content from the overlay file may be automatically merged into the document, so that the organization's logo is included as a header within the printed document.

Unfortunately, known systems and methods for creating and using overlay files with printing devices suffer from various drawbacks. In at least some known approaches, overlay files may be dependent on specific applications. Thus, an overlay file that is created using Microsoft Word® may not be useable with another word processing application, such as Corel WordPerfect®. Alternatively, or in addition, overlay files may be dependent on specific printer languages. Thus, an overlay file that is created for a particular printing device may not be useable with another printing device.

In view of the foregoing, benefits may be realized by improved systems and methods for creating and using overlay files with printing devices. Some exemplary systems and methods for creating and using overlays with printing devices are described herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
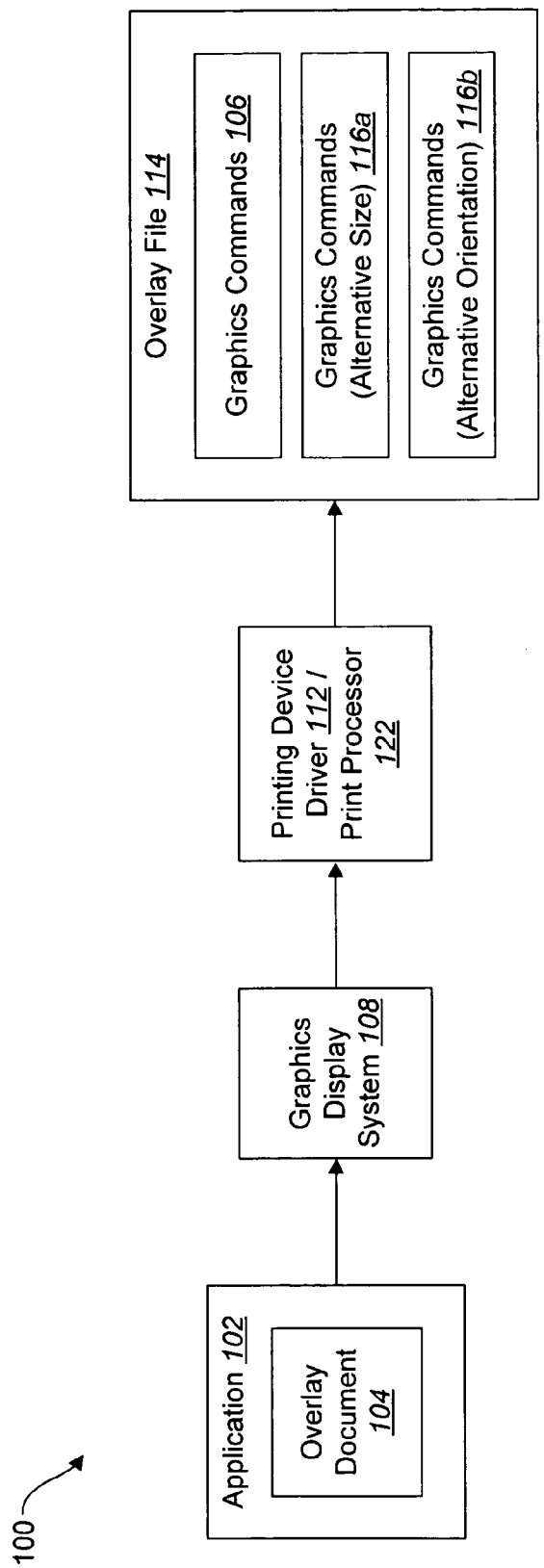
FIG. 1 is a block diagram which illustrates components that may be used to create an overlay file that is both application independent and device independent.

A method for creating and using overlays that are application independent and device independent is disclosed. The method may involve receiving a first request to save an overlay document that comprises content for an overlay. The method may also involve storing graphics commands for the overlay document in an overlay file. The graphics commands may be graphics device interface commands, device driver interface commands, etc. The format of the overlay file may be both application independent and device independent. For example, the format of the overlay file may be an enhanced metafile format, a version of the enhanced metafile format that is operating system independent, a printer metafile format, a version of the printer metafile format that is operating system independent, etc. In some embodiments, the method may also involve receiving a user's selection of the format for the overlay file.

The method may also involve storing alternative graphics commands in the overlay file. The alternative graphics commands may correspond to at least one alternative version of the overlay document. The alternative graphics commands may be formatted with at least one characteristic (e.g., paper size, paper orientation, etc.) that is different than the graphics commands for the overlay document. Alternatively, in some embodiments the overlay document itself may include multiple pages that have different formatting characteristics. In such embodiments, the overlay file already includes the graphics commands for the alternative versions of the overlay document, and it is not necessary for the driver/print processor to create the alternative versions.

The format of the overlay file may be modified to be operating system independent. This may involve replacing operating system specific commands in the overlay file with custom commands.

The method may also involve receiving a second request to print a base document. The base document may be created in a different application than the overlay document.

The method may also involve rendering at least some of the graphics commands in the overlay file, thereby creating printing commands for the overlay document. This rendering step may be performed in response to receiving the second request. In some embodiments, the graphics commands that correspond to a version of the overlay document that most closely matches at least one characteristic of the base document may be the graphics commands that are rendered.

Prior to rendering the graphics commands, the format of the overlay file may be modified for compatibility with an operating system of the computer system. This may involve replacing custom commands in the overlay file with operating system specific commands.

The printing commands for the overlay document may be scaled to substantially match a paper size of the base document. The printing commands for the overlay document may be merged with base document printing commands, thereby creating a printing command stream. The printing command stream may be sent to a printing device.

A computer system that is configured to implement the method described above is also disclosed. The computer system includes a processor and memory in electronic communication with the processor. Instructions are stored in the memory. The instructions are executable to implement the method described above. A computer-readable medium comprising executable instructions for implementing the method described above is also disclosed.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 is a block diagram which illustrates components that may be used to create an overlay file that is both application independent and device independent. The system 100 shown in FIG. 1 includes an application 102. A user of the application 102 may create a document 104 that includes content for an overlay, i.e., content that is intended to be superimposed on one or more other documents during printing. For example, the document 104 may include an organization's logo, a confidentiality designation, ruler lines, etc. This document 104 may be referred to herein as an overlay document 104.

At some point, the user of the application 102 requests that the overlay document 104 be saved. In response to the request, the application 102 provides graphics commands 106 for the overlay document 104 to a printing device driver 112 and/or print processor 122 via a graphics display system 108. In a Microsoft Windows® operating environment, the graphics display system 108 may be the graphics device interface (GDI).

The printing device driver 112 and/or print processor 122 store the graphics commands 106 corresponding to the overlay document 104 in an overlay file 114. In some embodiments, the driver 112 asks the graphics display system 108 to write the graphics commands 106 provided by the application 102 into the specified overlay file 114.

Advantageously, the format of the overlay file 114 is both application independent and device independent. In other words, the graphics commands 106 in the overlay file 114 are not associated with a specific application or with a specific printing device.

There are a variety of possible formats for the overlay file 114. For example, the overlay file 114 may be formatted according to the enhanced metafile (EMF) format. Alternatively, the overlay file 114 may be formatted according to the printer metafile (PMF) format. As will be discussed in greater detail below, a print processor 122 may modify the format of the overlay file 114 so that it is operating system independent. Thus, a version of EMF or PMF that is operating system independent may be used. A version of the EMF format that is operating system independent may be referred to herein as the EM2 format. A version of the PMF format that is operating system independent may be referred to herein as the PM2 format. Of course, other file formats may also be used in addition to those specifically listed herein.

In a Microsoft Windows® operating environment, the graphics commands 106 that are stored in the overlay file 114 may be GDI commands. Alternatively, the graphics commands 106 may be device driver interface (DDI) commands.

The graphics commands 106 for the overlay document 104 are formatted with certain characteristics, such as paper size, paper orientation, etc. In some embodiments, the driver 112 may store graphics commands 116 for one or more alternative versions of the overlay document 104 in the overlay file 114.

The graphics commands 116 for the alternative version(s) of the overlay document 104 are formatted with at least one characteristic that is different than the graphics commands 106 for the original overlay document 104.

In the illustrated embodiment, the driver 112 stores graphics commands 116 for two alternative versions of the overlay document 104 in the overlay file 114. In particular, the driver 112 stores graphics commands 116a for a first alternative version of the overlay document 104 and graphics commands 116b for a second alternative version of the overlay document 104. The graphics commands 116a for the first alternative version are formatted for a different paper size than the graphics commands 106 for the original overlay document 104. For example, if the graphics commands 106 for the original overlay document 104 are formatted for A4 paper, the graphics commands 116a for the first alternative version of the overlay document 104 may be formatted for A3, 8½"×11" (letter), 8½"×14" (legal), 7¼"×10½" (executive), etc. The graphics commands 116b for the second alternative version are formatted with a different paper orientation than the graphics commands 106 for the original overlay document 104. For example, if the graphics commands 106 for the original overlay document 104 are formatted for a portrait orientation, the graphics commands 116b for the second alternative version may be formatted for a landscape orientation.

Figure 2:
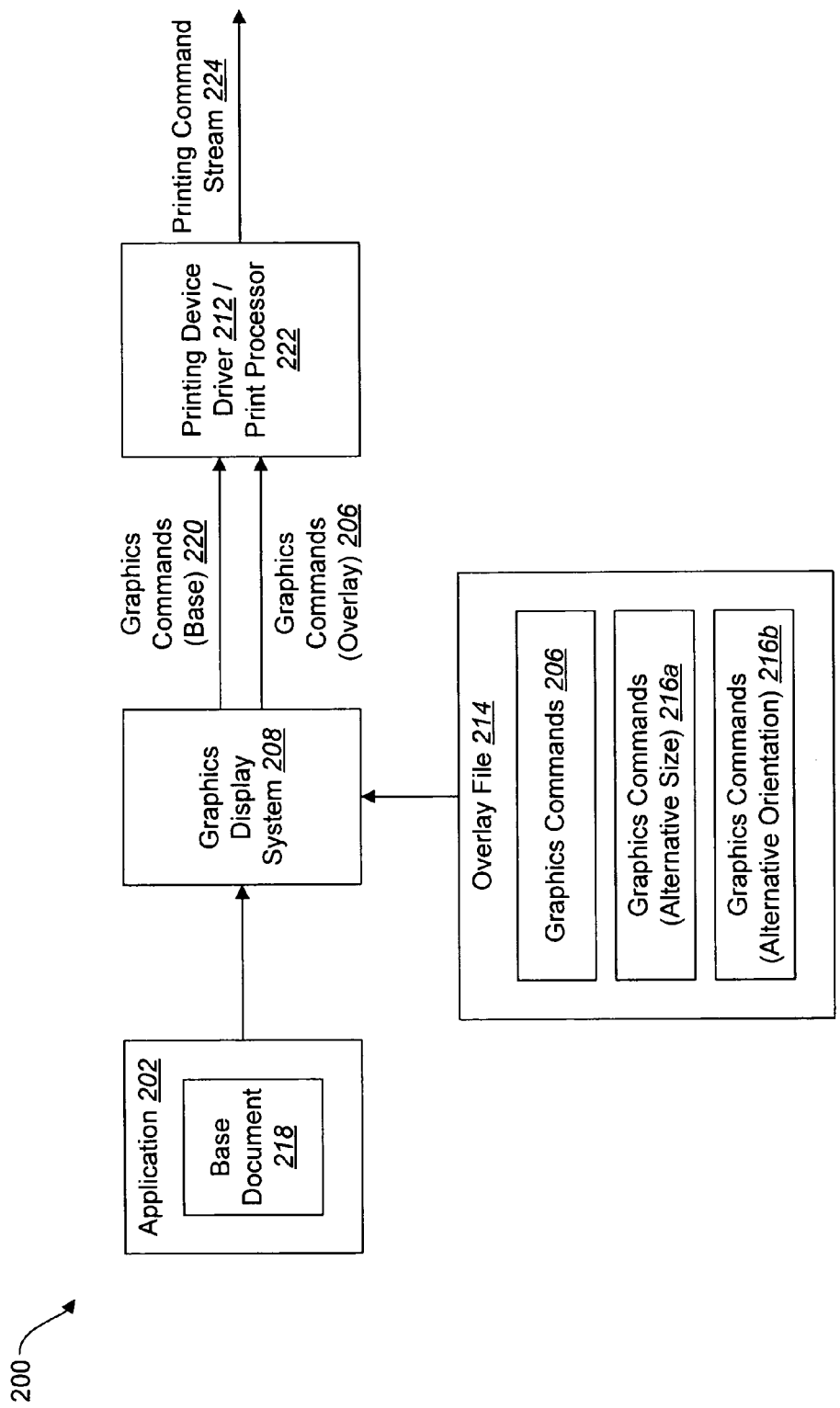
FIG. 2 is a block diagram which illustrates components that may be used to print a base document with an overlay file, where a base document may be any document that is created by a user of an application.

FIG. 2 is a block diagram which illustrates components that may be used to print a document 218 with an overlay file 214. The document 218 that is printed with the overlay file 214 will be referred to herein as a base document 218. The base document 218 may be any document that is created by a user of an application 202. Advantageously, the application 202 that is used to print the base document 218 may be different than the application 102 that was used to create the overlay file 214. This is because the format of the overlay file 214 is not dependent on any particular application. Thus, once the overlay file 214 has been created, it may be used by many different types of applications.

At some point, the user makes a request to print the base document 218. In response to the request, graphics commands 220 for the base document 218 are provided to a printing device driver 212 via a graphics display system 208. In addition, graphics commands 206 from the overlay file 214 are provided to the driver 212 via the graphics display system 208. In some embodiments, the driver 212 asks the graphics display system 208 to play back the overlay file 214 to the driver 212. As indicated above, in a Microsoft Windows® operating environment the graphics display system 208 may be the graphics device interface (GDI).

The driver 212 and a print processor 222 render the graphics commands 220 for the base document 218, thereby creating printing commands (not shown in FIG. 2) for the base document 218. The driver 212 and the print processor 222 also render the graphics commands 206 from the overlay file 214, thereby creating printing commands (not shown in FIG. 2) for the overlay document 104. The driver 212 and the print processor 222 then merge the printing commands for the base document 218 with the printing commands for the overlay document 104, thereby creating a printing command stream 224. The printing command stream 224 is then sent to a printing device (not shown).

As indicated above, the overlay file 214 may include graphics commands 216 for one or more alternative versions of the overlay document 104. In the illustrated embodiment, the overlay file 214 includes graphics commands 216a for a first alternative version of the overlay document 104 and graphics commands 216b for a second alternative version of the overlay document 104. The graphics commands 216a for the first alternative version are formatted with a different paper size than the graphics commands 206 for the original overlay document 104. The graphics commands 216b for the second alternative version are formatted with a different paper orientation than the graphics commands 206 for the original overlay document 104.

In some embodiments, the graphics commands 216 for an alternative version of the overlay document 104 may be selected for rendering instead of the graphics commands 206 for the original overlay document 104. The driver 212 may select the graphics commands in the overlay file 214 that correspond to a version of the overlay document 104 that most closely matches one or more characteristics of the base document 218. For example, if the base document 218 has a different paper size than the overlay document 104, the driver 212 may select the graphics commands 216a for an alternative version of the overlay document that matches (or at least more closely matches) the paper size of the base document 218. If the base document 218 has a different paper orientation than the overlay document 104, the driver 212 may select the graphics commands 216b for an alternative version of the overlay document that matches (or at least more closely matches) the paper orientation of the base document 218.

Figure 3:
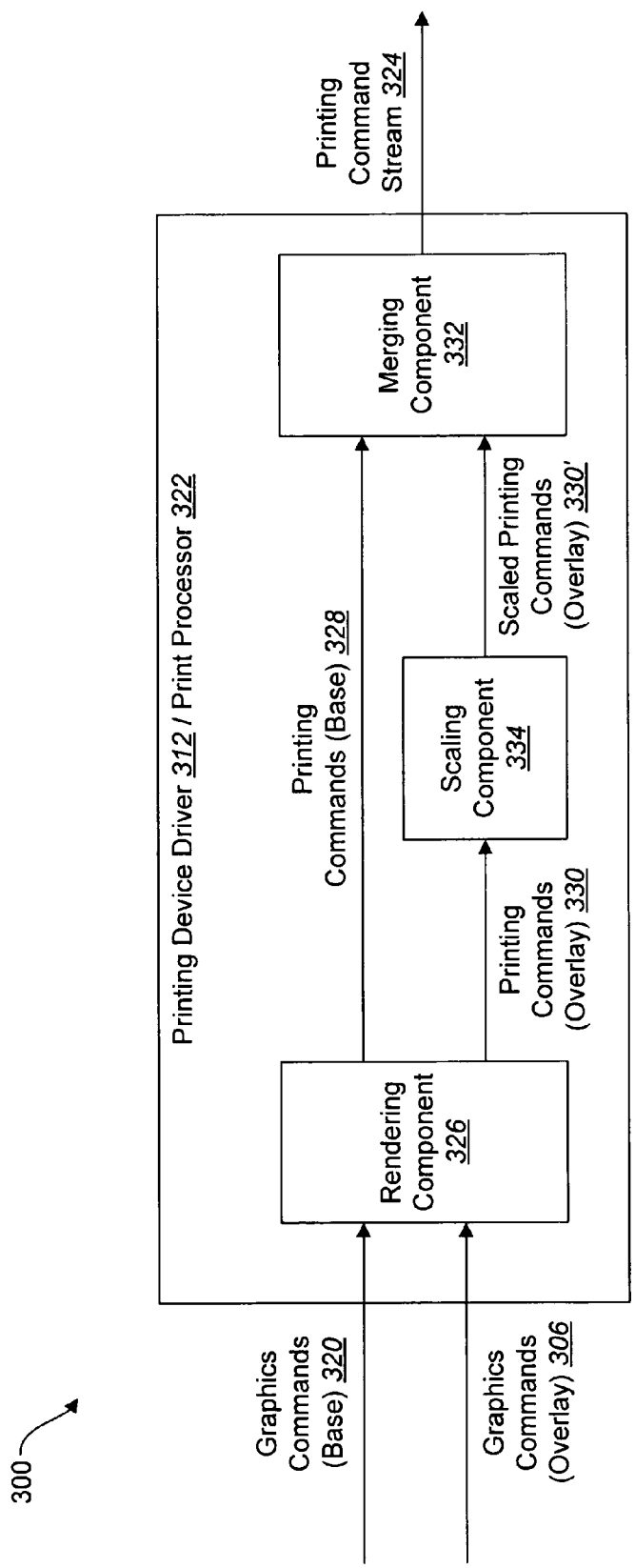
FIG. 3 is a block diagram which illustrates components that may be used to convert graphics commands for a base document and graphics commands for an overlay document into a printing command stream.

FIG. 3 is a block diagram which illustrates components that may be used to convert graphics commands 320 for a base document 218 and graphics commands 306 for an overlay document 104 into a printing command stream 324. The system 300 shown in FIG. 3 includes a printing device driver 312 and a print processor 322.

The driver 312 receives the graphics commands 320 for the base document 218. A rendering component 326 renders these graphics commands 320, thereby creating printing commands 328 for the base document 218. The driver 312 also receives the graphics commands 306 for the overlay document 218. The rendering component 326 renders these graphics commands 306, thereby creating printing commands 330 for the overlay document 104.

Under some circumstances, the size of the base document 218 may be different than the size of the overlay document 104. If this occurs, a scaling component 334 may be provided to scale the printing commands 330 of the overlay document 104, thereby creating scaled printing commands 330' that substantially match the paper size of the base document 218.

A merging component 332 merges the printing commands 328 for the base document 218 with the printing commands 330 (or the scaled printing commands 330') for the overlay document 104, thereby creating a printing command stream 324. The printing command stream 324 is sent to a printing device (not shown).

Figure 4:
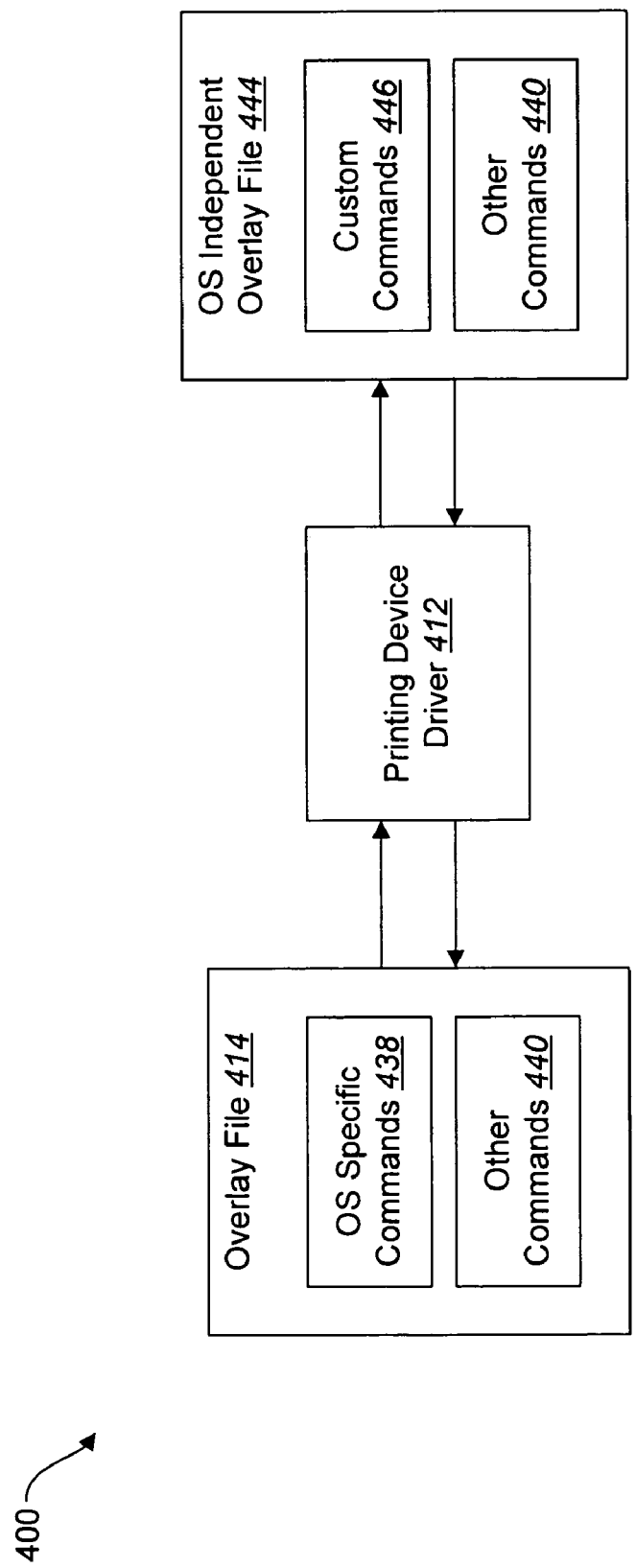
FIG. 4 is a block diagram which illustrates components that may be used to modify an overlay file to be operating system independent.

FIG. 4 is a block diagram which illustrates components that may be used to modify an overlay file 414 to be operating system (OS) independent. The overlay file 414 in the system 400 shown in FIG. 4 includes at least some graphics commands 438 that are OS specific. The overlay file 414 may also include at least some other graphics commands 440 that are not OS specific. The driver 412 may replace the OS specific commands 438 with custom commands 446 that are not tied to any particular OS, thereby creating a version of the overlay file 444 that is OS independent. In some embodiments the custom commands 446 may relate to resources, such as fonts, that are not standard on every computer system.

If the OS independent overlay file 444 is subsequently used in connection with the printing of a base document 218, the driver 412 may modify the format of the OS independent overlay file 444 for compatibility with the OS of the computer system that is being used to print the base document 218. This step is typically performed prior to rendering the graphics commands in the OS independent overlay file 444. To modify the format of the OS independent overlay file 444, the driver 412 may replace the custom commands 446 in the OS independent overlay file 444 with OS specific commands 438.

Figure 5:
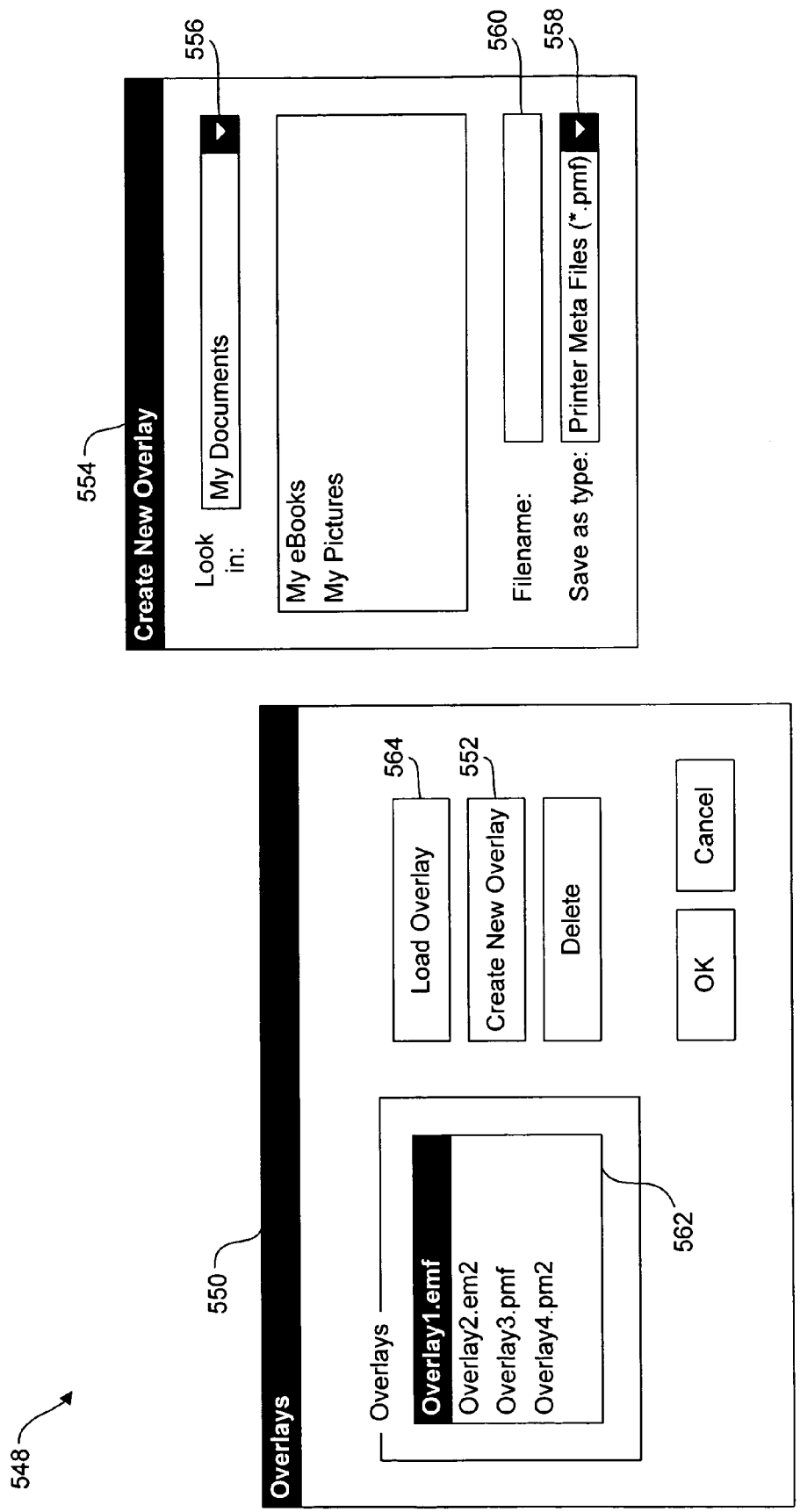
FIG. 5 illustrates some features of an exemplary user interface that may be utilized by a printing device driver in some embodiments.

FIG. 5 illustrates some features of an exemplary user interface 548 that may be utilized by a printing device driver 112 in some embodiments. The user interface 548 includes a main window 550.

The main window 550 of the user interface 548 may be displayed to a user after the user has requested that an overlay document 104 be saved. The main window 550 includes a Create New Overlay button 552. If the user selects the Create New Overlay button 552, a dialog box 554 may be displayed. The dialog box 554 includes various controls which allow the user to select the format for the overlay file 114. In particular, the dialog box 554 includes a first drop-down menu 556 which allows the user to specify a desired directory for saving the new overlay file 114. The dialog box 554 also includes a second drop-down menu 558 which allows the user to select a format for the new overlay file 114. As discussed above, some exemplary formats that may be used include EMF, EM2, PMF, PM2, etc. The dialog box 554 also includes a text box 560 which allows the user to specify the filename for the new overlay file 114.

The main window 550 of the user interface 548 may also be displayed to a user after the user has initiated printing of a base document 218. The user interface 548 includes various controls which allow the user to select the specific overlay file 114 that will be used in connection with the printing of the base document 218. In particular, the main window 550 includes a list box 562 for displaying available overlay files 114. The main window 550 also includes a Load Overlay button 564. The user may select a particular overlay file 114 by highlighting the desired overlay file 114 within the list box 562, and then selecting the Load Overlay button 564.

Figure 6:
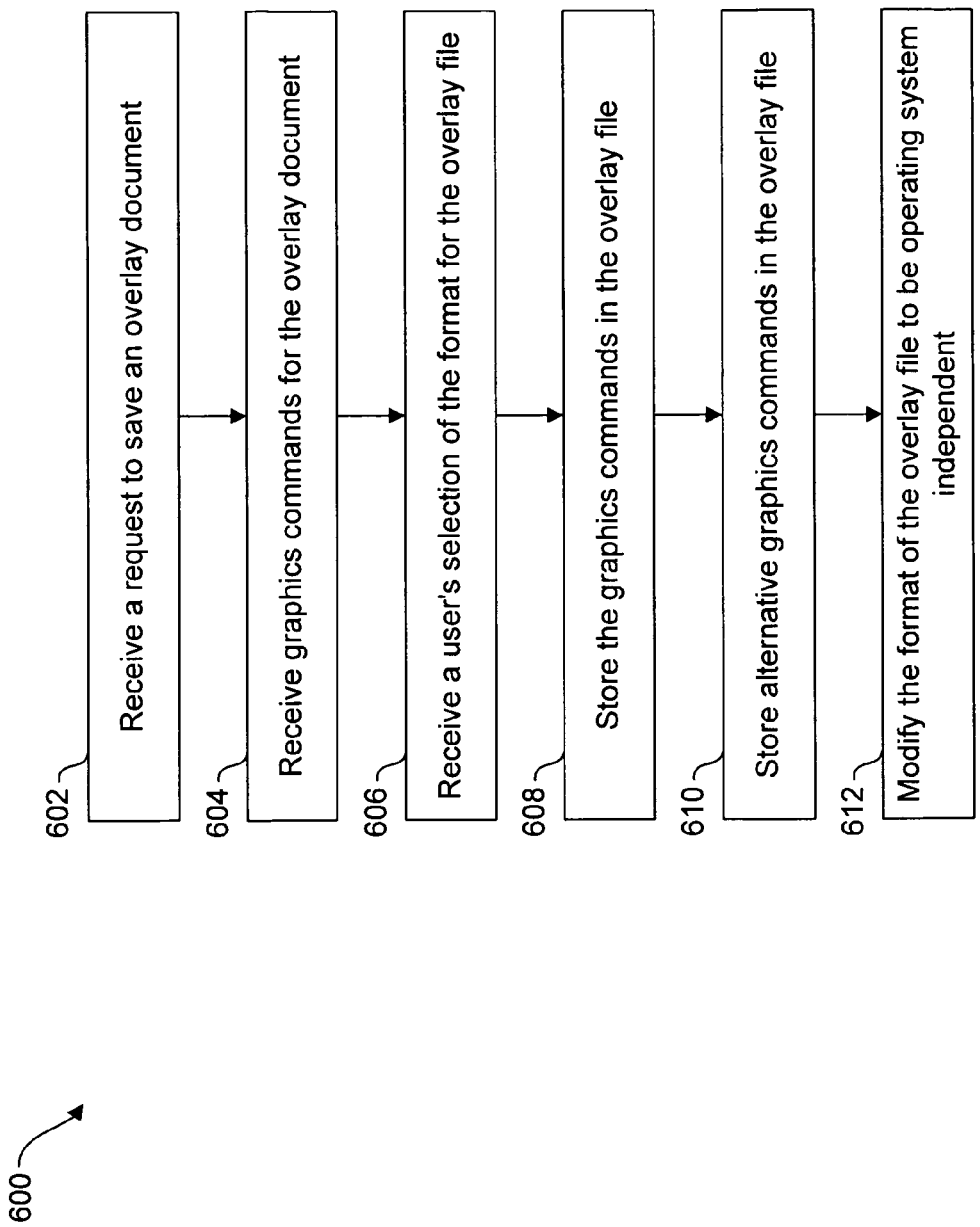
FIG. 6 illustrates an embodiment of a method for creating an overlay file that is application independent and device independent.

FIG. 6 illustrates an embodiment of a method 600 for creating an overlay file 114 that is application independent and device independent. The method 600 may be performed by a printing device driver 112 and a print processor 122.

The method 600 begins when a request is received 602 to save an overlay document 104. As indicated above, an overlay document 104 is a document that includes content for an overlay, i.e., content that is intended to be superimposed on one or more other documents during printing. In some embodiments, the application receives a user's request to print a document (e.g., by the user selecting the "Print" option in the "File" menu). Then, in the user interface of the driver 112, the user requests that the graphics be saved into an overlay instead of printing them. Alternatively, it may be possible for the user to make a request to save an overlay via the user interface of the application itself. The application may then send the request to the printing device driver 112 and/or the print processor 122.

Graphics commands 106 for the overlay document 104 are received 604. The graphics commands 106 may be received from the application 102 via a graphics display system 108.

As indicated above, there are a variety of possible formats for the overlay file 114. Some exemplary formats that may be used include EMF, EM2, PMF, and PM2. The user's selection of the format for the overlay file 114 may be received 606. In some embodiments, the user's selection may be received via a user interface 548.

Graphics commands 106 corresponding to the overlay document 104 are stored 608 in an overlay file 114. Advantageously, the format of the overlay file 114 is both application independent and device independent. In a Microsoft Windows® operating environment, the graphics commands 106 that are stored in the overlay file 114 may be GDI commands, DDI commands, etc.

In some embodiments, graphics commands 116 for one or more alternative versions of the overlay document 104 may also be stored 610 in the overlay file 114. The graphics commands 116 for the alternative version(s) of the overlay document 104 may be formatted with at least one characteristic that is different than the graphics commands 106 for the original overlay document 104. For example, the alternative graphics commands 116 may be formatted for a different paper size, paper orientation, etc.

The format of the overlay file 114 may be modified 612 to be operating system independent. This may involve replacing graphics commands 438 in the overlay file 114 that are operating system specific with custom commands 446 that are not tied to any particular operating system.

Figure 7:
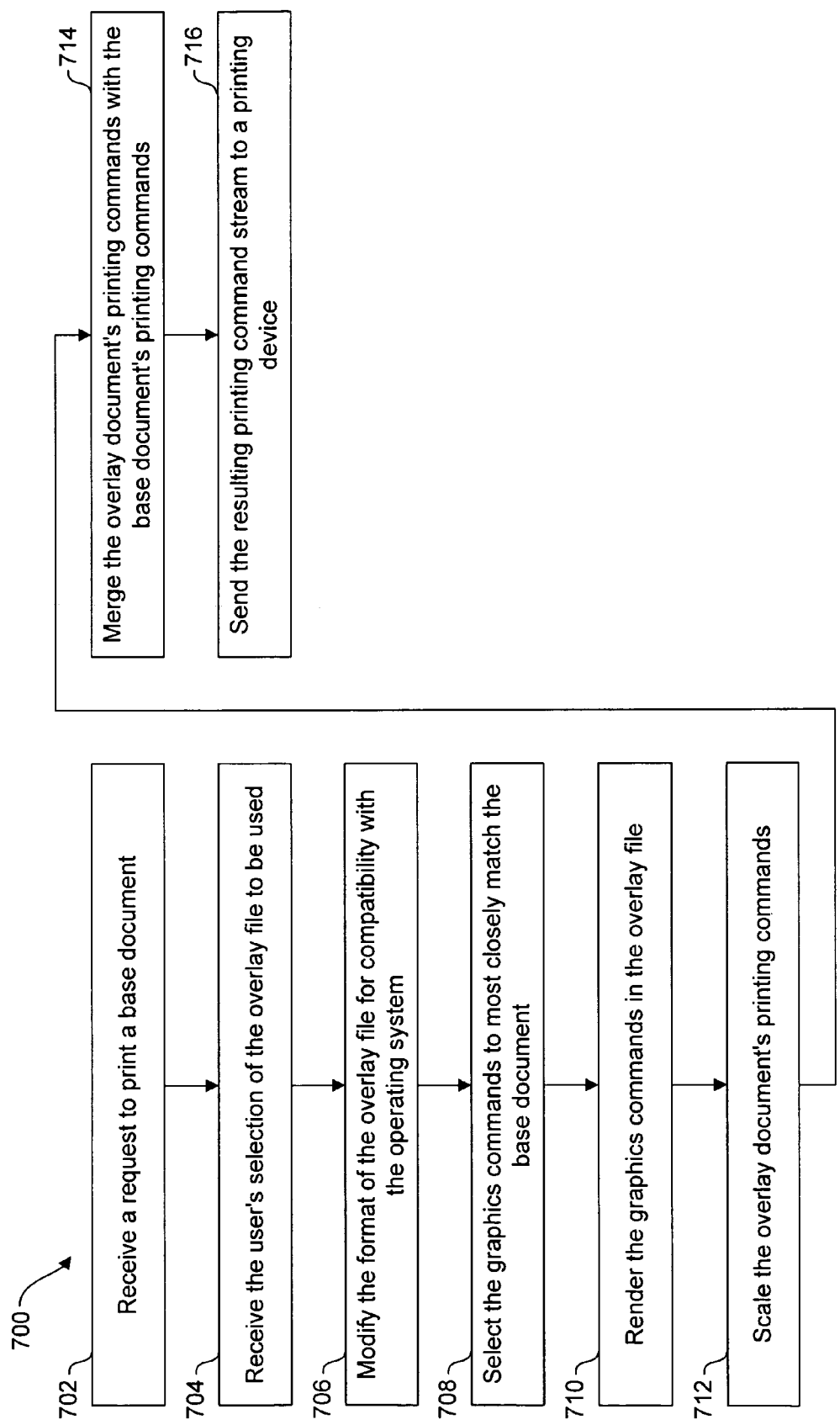
FIG. 7 illustrates an embodiment of a method for printing a base document with an overlay file that is both application independent and device independent.

FIG. 7 illustrates an embodiment of a method 700 for printing a base document 218 with an overlay file 114 that is both application independent and device independent. The method 700 may be performed by a printing device driver 112 and a print processor 122.

The method 700 begins when a request is received 702 to print a base document 218. The request may be received from an application 202, in response to the application 202 receiving a user's request to print the base document 218.

The base document 218 is printed with an overlay that is defined by an overlay file 114. In some embodiments, the user may be given an opportunity to select the overlay file 114 to be used. In such embodiments, the method 700 may involve receiving 704 the user's selection of the overlay file 114. The user's selection may be received via a user interface 548. In alternative embodiments, the overlay file 114 that is used may be automatically selected.

In some embodiments, the overlay file 114 that is selected in step 704 may be operating system independent. In such embodiments, the method 700 may involve modifying 706 the format of the overlay file 114 for compatibility with the operating system of the computer system that is being used to print the base document 218. This may involve replacing custom commands 446 in the overlay file 114 with operating system specific commands 438.

In some embodiments, the overlay file 114 may include graphics commands 116 for one or more alternative versions of the overlay document 104. In such embodiments, the method 700 may involve selecting 708 the graphics commands 116 that most closely match one or more characteristics of the base document 218, such as paper size, paper orientation, etc.

The graphics commands (either the graphics commands 106 that correspond to the original overlay document 104, or alternative graphics commands 116 that correspond to an alternative version of the overlay document 104) are rendered 710, thereby creating printing commands 330 for the overlay document 104. Under some circumstances, the size of the base document 218 may be different than the size of the overlay document 104. If this occurs, the printing commands 330 may be scaled 712 in order to substantially match the paper size of the base document 218.

The printing commands 330 (or the scaled printing commands 330') for the overlay document 104 are merged 714 with the printing commands 328 for the base document 218, thereby creating a printing command stream 224. This printing command stream 224 is sent 716 to a printing device for printing.

Figure 8:
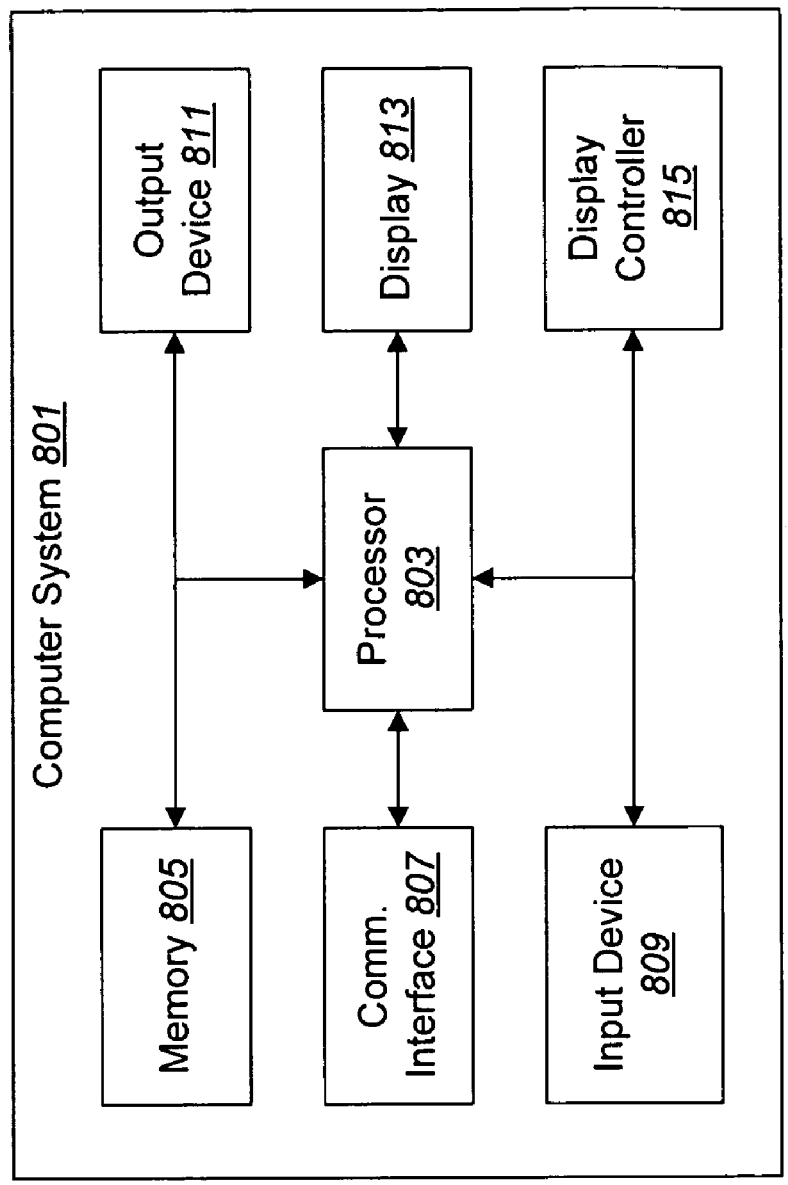
FIG. 8 is a block diagram illustrating the major hardware components typically utilized in a computer system.

FIG. 8 is a block diagram illustrating the major hardware components typically utilized in a computer system 801. The illustrated components may be located within the same physical structure or in separate housings or structures.

The computer system 801 includes a processor 803 and memory 805. The processor 803 controls the operation of the computer system 801 and may be embodied as a microprocessor, a microcontroller, a digital signal processor (DSP) or other device known in the art. The processor 803 typically performs logical and arithmetic operations based on program instructions stored within the memory 805.

As used herein, the term memory 805 is broadly defined as any electronic component capable of storing electronic information, and may be embodied as read only memory (ROM), random access memory (RAM), magnetic disk storage media, optical storage media, flash memory devices in RAM, on-board memory included with the processor 803, EPROM memory, EEPROM memory, registers, etc. The memory 805 typically stores program instructions and other types of data. The program instructions may be executed by the processor 803 to implement some or all of the methods disclosed herein.

The computer system 801 typically also includes one or more communication interfaces 807 for communicating with other electronic devices. The communication interfaces 807 may be based on wired communication technology, wireless communication technology, or both. Examples of different types of communication interfaces 807 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 801 typically also includes one or more input devices 809 and one or more output devices 811. Examples of different kinds of input devices 809 include a keyboard, mouse, microphone, remote control device, button, joystick, trackball, touchpad, lightpen, etc. Examples of different kinds of output devices 811 include a speaker, printer, etc. One specific type of output device which is typically included in a computer system is a display device 813. Display devices 813 used with embodiments disclosed herein may utilize any suitable image projection technology, such as a cathode ray tube (CRT), liquid crystal display (LCD), light-emitting diode (LED), gas plasma, electroluminescence, or the like. A display controller 815 may also be provided, for converting data stored in the memory 805 into text, graphics, and/or moving images (as appropriate) shown on the display device 813.

Of course, FIG. 8 illustrates only one possible configuration of a computer system 801. Various other architectures and components may be utilized.

Figure 9:
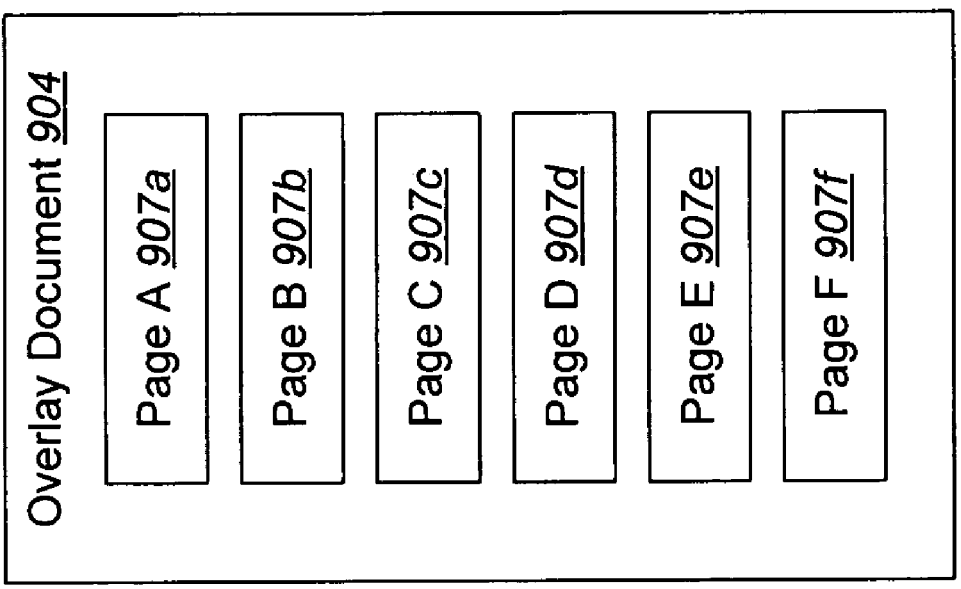
FIG. 9 illustrates an overlay document that may be created by an application according to an embodiment.

FIG. 9 illustrates an overlay document 904 that may be created by an application 102 according to an embodiment. The overlay document 904 includes six pages 907, namely page A 907*a*, page B 907*b*, page C 907*c*, page D 907*d*, page E 907*e*, and page F 907*f*.

Figure 10C:
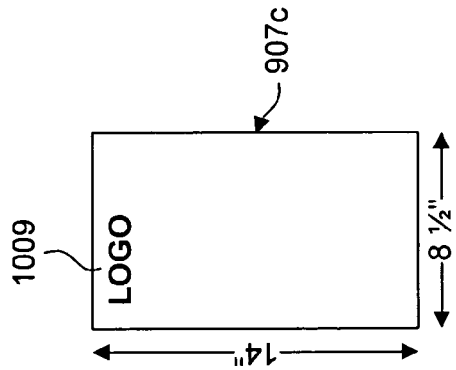
FIGS. 10A-10F illustrate the pages of the overlay document shown in FIG. 9.
Figure 10F:
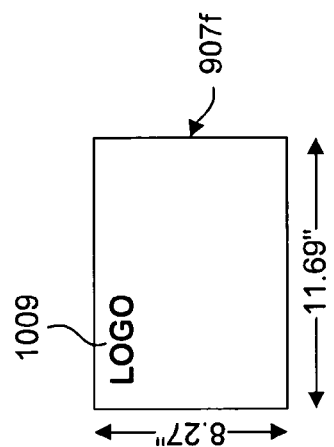
Figure 10B:
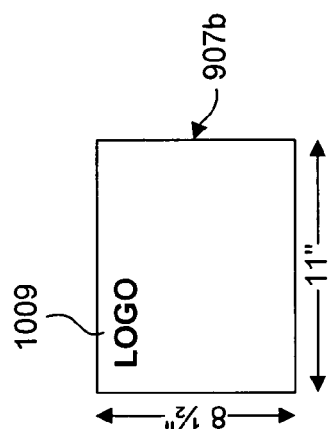
Figure 10E:
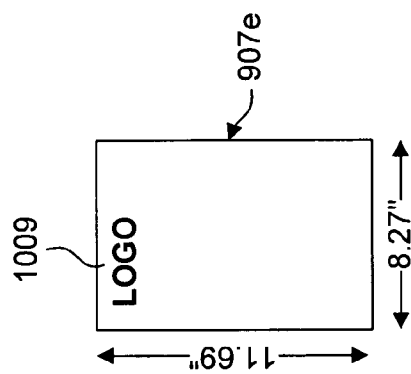
Figure 10A:
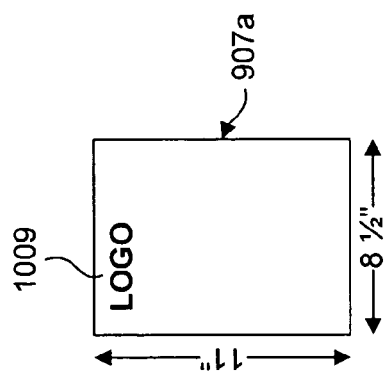
Figure 10D:
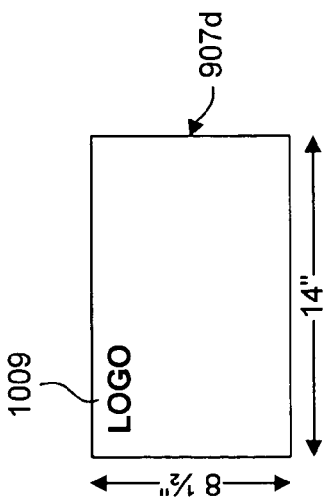

FIGS. 10A-10F illustrate the pages 907 of the overlay document 904. The different pages 907 are formatted differently. As shown in FIG. 10A, page A 907*a* is formatted for letter-sized paper (8½"×11") and for portrait orientation. As shown in FIG. 10B, page B 907*b* is formatted for letter-sized paper and for landscape orientation. As shown in FIG. 10C, page C 907*c* is formatted for legal-sized paper (8½"×14") and for portrait orientation. As shown in FIG. 10D, page D 907*d* is formatted for legal-sized paper and for landscape orientation. As shown in FIG. 10E, page E 907*e* is formatted for A4 paper (approximately 8.27"×11.69") and for portrait orientation. As shown in FIG. 10F, page F 907*f* is formatted for A4 paper and for landscape orientation.

Each page 907 of the overlay document 904 includes the same overlay content 1009, which in the illustrated embodiment is a company logo. The overlay content 1009 is positioned in the upper left corner of each page 907.

There are a variety of different approaches that may be used to achieve the different formatting of the pages 907 of the overlay document 904, as shown in FIGS. 10A-F. For example, some applications (e.g., Microsoft Word®) support having different sections within a document. Each section can have different paper sizes and orientations. Alternatively, for applications that do not support multiple sections, the user may print six separate one-page overlay documents and then gather all the overlays into a single overlay document.

When the user saves the overlay document 904, graphics commands corresponding to the overlay document 904 are stored in an overlay file. The overlay file is both application independent and device independent. In embodiments discussed previously, it was mentioned that the driver/print processor could store graphics commands for alternative versions of the overlay document in the overlay file. In the illustrated embodiment, because the overlay document 904 itself includes multiple pages with different formatting characteristics, the overlay file that is created already includes the graphics commands for the alternative versions of the overlay document, and it is not necessary for the driver/print processor to create and store the graphics commands for the alternative versions.

When a user wants to print a base document with the overlay file, the user may be prompted to select the page 907 of the overlay document 904 that is used. Typically, the user selects the page 907 that has the same formatting characteristics as the base document. For example, if the user is printing a base document that is formatted for letter-sized paper and landscape orientation, then the user may select page B 907*b* of the overlay document 904.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. In a computer system, a method for creating and using overlays that are application independent and device independent, comprising:

receiving a first request to save an overlay document that comprises content for an overlay;

storing graphics commands for the overlay document in an overlay file, wherein the overlay file has a format, wherein the format of the overlay file is both application independent and device independent, wherein the format of the overlay file is selectable, and wherein the overlay file comprises multiple versions of the overlay;

receiving a second request to print a base document;

selecting, from the overlay file, the graphics commands for the version of the overlay that most closely matches at least one characteristic in the base document, wherein the selecting occurs after a request to print the base document has been received;

rendering the selected graphics commands in the overlay file, thereby creating printing commands for the overlay document;

merging the printing commands for the overlay document with base document printing commands, thereby creating a printing command stream; and sending the printing command stream to a printing device.

2. The method of claim 1, wherein the base document is created in a different application than the overlay document.

3. The method of claim 1, further comprising modifying the format of the overlay file to be operating system independent.

4. The method of claim 3, wherein modifying the format of the overlay file comprises replacing operating system specific commands in the overlay file with custom commands.

5. The method of claim 1, further comprising, prior to rendering the selected graphics commands, modifying the format of the overlay file for compatibility with an operating system of the computer system.

6. The method of claim 5, wherein modifying the format of the overlay file comprises replacing custom commands in the overlay file with operating system specific commands.

7. The method of claim 1, further comprising scaling the printing commands for the overlay document to substantially match a paper size of the base document.

8. The method of claim 1, wherein each version of the overlay comprises alternative graphics commands corresponding to at least one alternative version of the overlay document, and wherein the alternative graphics commands are formatted with at least one characteristic that is different than the graphics commands for the overlay document.

9. The method of claim 8, wherein the at least one characteristic comprises paper size.

10. The method of claim 8, wherein the at least one characteristic comprises paper orientation.

11. The method of claim 1, further comprising receiving a user's selection of the format for the overlay file.

12. The method of claim 1, further comprising receiving a user's selection of the overlay file.

13. The method of claim 1, wherein the graphics commands are selected from the group consisting of graphics device interface commands and device driver interface commands.

14. The method of claim 1, wherein the step of storing the graphics commands in the overlay file is performed in response to the first request.

15. The method of claim 1, wherein the steps of rendering the selected graphics commands in the overlay file, merging the printing commands for the overlay document with base document printing commands, and sending the printing command stream to the printing device are performed in response to the second request.

16. The method of claim 1, wherein the overlay document comprises multiple pages that have different formatting characteristics.

17. The method of claim 1, wherein the format of the over file is EMF (enhanced metafile format), PMF (printer metafile format), PM2 (a version of the PMF format that is operating system independent) or EM2 (a version of an EMF format that is operating system independent).

18. A computer system that is configured for creating and using overlays that are application independent and device independent, the computer system comprising:

a processor;

memory in electronic communication with the processor;

instructions stored in the memory, the instructions being executable to:

receive a first request to save an overlay document that comprises content for an overlay;

store graphics commands for the overlay document in an overlay file, wherein the overlay file has a format, wherein the format of the overlay file is both application independent and device independent, wherein the format of the overlay file is selectable, and wherein the overlay file comprises multiple versions of the overlay;

receive a second request to print a base document;

select, from the overlay file, the graphics commands for the version of the overlay that most closely matches at least one characteristic in the base document, wherein the selecting occurs after a request to print the base document has been received;

render the selected graphics commands in the overlay file, thereby creating printing commands for the overlay document;

merge the printing commands for the overlay document with base document printing commands, thereby creating a printing command stream; and send the printing command stream to a printing device.

19. A non-transitory medium comprising executable instructions for creating and using overlays that are application independent and device independent, the instructions being executable to:

receive a first request to save an overlay document that comprises content for an overlay;

store graphics commands for the overlay document in an overlay file, wherein the overlay file has a format, wherein the format of the overlay file is selectable by a user and is both application independent and device independent, wherein the format of the overlay file is selectable, and wherein the overlay file comprises multiple versions of the overlay;

receive a second request to print a base document;

select, from the overlay file, the graphics commands for the version of the overlay that most closely matches at least one characteristic in the base document, wherein the selecting occurs after a request to print the base document has been received;

render the selected graphics commands in the overlay file, thereby creating printing commands for the overlay document;

merge the printing commands for the overlay document with base document printing commands, thereby creating a printing command stream; and send the printing command stream to a printing device.

* * * * *

UNITED STATES PATENT AND TRADEMARK OFFICE
CERTIFICATE OF CORRECTION

PATENT NO. : 7,859,705 B2  Page 1 of 1
APPLICATION NO. : 11/255172
DATED : December 28, 2010
INVENTOR(S) : Radha Madhavi Gokaraju et al.

It is certified that error appears in the above-identified patent and that said Letters Patent is hereby corrected as shown below:

In column 10, line 4 please delete "comer" and replace it with --corner--.
    In column 12, line 44 please delete "over" and replace it with --overlay--.
    In column 13, line 11 please delete "A non-transitory medium" and replace it with
--A non-transitory computer-readable medium--.

Signed and Sealed this
Twenty-sixth Day of April, 2011

David J. Kappos
*Director of the United States Patent and Trademark Office*